(12) United States Patent
Bechtold et al.

(10) Patent No.: US 11,680,540 B2
(45) Date of Patent: Jun. 20, 2023

(54) PISTON FOR AN INTERNAL COMBUSTION ENGINE AND PRODUCTION METHOD

(71) Applicant: Mahle International GmbH, Stuttgart (DE)

(72) Inventors: Peter Bechtold, Rottweil (DE); Michael Biswurm, Rottweil (DE)

(73) Assignee: Mahle International GmbH

(*) Notice: Subject to any disclaimer, the term of this patent is extended or adjusted under 35 U.S.C. 154(b) by 0 days.

(21) Appl. No.: 17/505,620

(22) Filed: Oct. 19, 2021

(65) Prior Publication Data

US 2022/0120234 A1 Apr. 21, 2022

(30) Foreign Application Priority Data

Oct. 20, 2020 (DE) .................... 10 2020 213 242.9

(51) Int. Cl.
*F02F 3/28* (2006.01)

(52) U.S. Cl.
CPC ............ *F02F 3/28* (2013.01); *F02F 2200/00* (2013.01)

(58) Field of Classification Search
CPC . F02F 3/28; F02F 2200/00; F02F 3/02; B23P 15/10; F16J 1/006; F16J 9/22
See application file for complete search history.

(56) References Cited

U.S. PATENT DOCUMENTS

| | | | |
|---|---|---|---|
| 3,463,057 A | 8/1969 | Packard et al. | |
| 3,712,099 A | 1/1973 | Elsbett et al. | |
| 4,178,899 A | 12/1979 | Julich | |
| 4,648,309 A | * | 3/1987 | Schellmann ............ F02F 3/022 123/193.6 |
| 4,716,817 A | * | 1/1988 | Ripberger ................. F16J 1/02 123/193.6 |

(Continued)

FOREIGN PATENT DOCUMENTS

| | | |
|---|---|---|
| AT | 333 079 B | 11/1976 |
| CH | 310940 A | 11/1955 |

(Continued)

OTHER PUBLICATIONS

English abstract for DE-26 20 716.

(Continued)

*Primary Examiner* — Kurt Philip Liethen
(74) *Attorney, Agent, or Firm* — Fishman Stewart PLLC (57) ABSTRACT

A piston for an internal combustion engine may include a piston crown, a piston body, and a ring portion. The piston body may have a radially outermost piston outer surface, which may emanate from the piston crown and extend axially and in a circumferential direction. The ring portion may be disposed axially spaced apart from the piston crown. The ring portion may extend axially and in the circumferential direction. The ring portion may include a ring carrier with a ring groove configured to receive a piston ring. The ring portion may further include a radially outer ring portion outer surface that extends in the circumferential direction. The ring portion outer surface may be disposed radially to an inside relative to the piston outer surface. The piston outer surface may extend elliptically in the circumferential direction. The ring portion outer surface may extend rotation-symmetrically in the circumferential direction.

19 Claims, 3 Drawing Sheets

(56) References Cited

U.S. PATENT DOCUMENTS

| | | | | |
|---|---|---|---|---|
| 5,119,777 | A * | 6/1992 | Mielke | F16J 9/22 29/888.047 |
| 5,474,307 | A * | 12/1995 | DeBiasse | F16J 9/063 277/467 |
| 5,477,821 | A * | 12/1995 | Chapple | F16J 9/22 123/193.6 |
| 6,935,220 | B2 * | 8/2005 | Dunaevsky | F02F 3/00 92/159 |
| 7,044,473 | B1 * | 5/2006 | Zhu | F16J 9/203 277/459 |
| 2007/0261658 | A1 * | 11/2007 | Abe | F16J 1/09 123/193.6 |
| 2015/0020681 | A1 | 1/2015 | Gniesmer et al. | |
| 2019/0218997 | A1 * | 7/2019 | Yang | F02F 3/22 |

FOREIGN PATENT DOCUMENTS

| | | |
|---|---|---|
| DE | 2005663 A1 | 8/1971 |
| DE | 1 751 013 A1 | 9/1971 |
| DE | 2 007 647 A1 | 9/1971 |
| DE | 2 243 230 A1 | 3/1974 |
| DE | 124930 C | 2/1976 |
| DE | 26 20 716 A1 | 12/1977 |
| DE | 10 2012 006 834 A1 | 3/2013 |
| DE | 10 2016 215 278 A1 | 2/2018 |
| EP | 3284558 A1 | 2/2018 |
| JP | S60-259752 A | 12/1985 |
| JP | H08-82243 A | 3/1996 |

OTHER PUBLICATIONS

English abstract for JP H08-82243.
English abstract for JP-S60-259752.
English abstract for DE-10 2016 215 278.
German Search Report for DE-102020213242.9, dated Jan. 4, 2021.
European Search Report dated Feb. 11, 2022 for copending European Patent App. No. EP21203153.

* cited by examiner

PISTON FOR AN INTERNAL COMBUSTION ENGINE AND PRODUCTION METHOD

CROSS-REFERENCE TO RELATED APPLICATIONS

This application claims priority to German Patent Application No. DE 10 2020 213 242.9, filed on Oct. 20, 2020, the contents of which is hereby incorporated by reference in its entirety.

TECHNICAL FIELD

The present invention relates to a piston for an internal combustion engine, which comprises an axially front-side piston crown and a radially outermost piston outer surface, which runs elliptically in the circumferential direction. The invention, furthermore, relates to a method for producing such a piston.

BACKGROUND

Pistons for internal combustion engines are thoroughly known from the prior art. During the operation of an internal combustion engine these perform a stroke movement in order to provide the energy generated during the combustion in a combustion chamber, usually via a crankshaft, to a drive, for example in a motor vehicle. Such pistons are received in an associated cylinder, wherein the piston, with a piston crown at the front side in the axial direction, delimits the combustion chamber.

In order to achieve a sealing between the piston and the cylinder upon the stroke adjustment of the piston during the operation it is known to employ at least one piston ring. For this purpose, the piston comprises for the respective piston ring a ring groove that is radially open to the outside, in which the piston ring is received.

In order to cope with the loading of the piston ring and thus of the ring groove during the operation, such pistons frequently comprise, in particular in the ring groove that is axially nearest-adjacent to the piston crown, a ring carrier as a reinforcement, wherein the ring carrier usually has a greater hardness than a main body of the piston, which in the following is also referred to as piston body. Here, piston bodies made of light metal are known.

Such pistons are usually produced by way of a casting method. It is also known to forge such pistons. During the production of the pistons it is usual to initially produce an outermost outer surface of the piston adjacent to the cylinder by machining a blank, before the ring groove is introduced, in particular recessed. On producing the ring groove burrs are usually formed. During the operation of the piston, such burrs lead to increased wear and increased mechanical loading. It is therefore known to remove such burrs by introducing chamfers on relevant edges of the ring groove. Alternatively or additionally it is known to move the region of the ring groove radially to the inside. Here, the radial moving takes place in a ring portion including the ring groove, which is axially spaced apart from the piston crown and usually extends closed in the circumferential direction. Here, the ring portion axially protrudes over the ring carrier on both sides, so that through the radial moving of the ring portion to the inside a contact of the harder ring carrier with the cylinder wall is prevented.

Here, providing the piston with the ring portion and introducing the ring groove each require separate production steps in the process, which generally take place after the machining of the blank for producing the piston outer surface.

Usually, the cast or forged blanks are initially turned in order to produce in a preform the piston outer surface. Following this, a radial recess for producing the ring portion is machined, again by turning, into the piston outer surface of the preform. Following this, the ring groove is introduced and likewise chamfered and thus deburred. Thus, the production of a piston per se involves multiple production steps.

In order to take into account the different loads of the piston during the stroke movements, in particular the so-called pressure side and counter-pressure side of the piston, it is known to produce the piston outer surface oval in the circumferential direction, in particular elliptical. Thus, the piston outer surface does not follow a rotation-symmetrical course in the circumferential direction. This requires additional effort during the production of the piston. It is necessary for example during the production of the elliptical piston outer surface to superimpose oscillations on a rotary movement during the turning of the blank, which correspondingly complicate the production of the piston. In addition, such machining requires the provision of corresponding, different tools.

Pistons of the type described above and the production method of the same are known for example from DE 2 005 663 A1, DD 124930 and DE 26 20 716 C3. In addition, such pistons and their production methods are described and shown in the book "Pistons and engine testing" of MAHLE GmbH from the year 2011 and in the "Piston manual" by Nüral.

SUMMARY

The present invention deals with the object of stating for a piston for an internal combustion engine and for a production method of such a piston improved or at least other embodiments which are characterised in particular by a simplified and cost-effective production.

According to the invention, this object is solved through the subject matter of the independent claim(s). Advantageous embodiments are the subject matter of the dependent claim(s).

The present invention is based on the general idea of forming an outer surface of a piston that is otherwise elliptical in the circumferential direction in the region of a ring groove for receiving a piston ring, rotation-symmetrically, i.e. round in the circumferential direction. Thus, the complex producing and forming of the ring groove compared with the remaining elliptical outer surface can take place in a simplified and cost-effective manner. In particular, machining steps for forming the region including the ring groove, in the following also referred to as ring portion, can take place in a simplified manner, in particular in a simplified manner by turning. Beside the simplified production, this also leads to an increase of the cycle numbers for producing such pistons and consequently also to reduced production costs.

According to the inventive idea, the piston comprises a piston crown at the front side in the axial direction. A main body of the piston, which in the following is also referred to as piston body, comprises a radially outermost outer surface of the piston, which in the following is also referred to as piston outer surface. The piston outer surface extends axially and in the circumferential direction. Further, the piston comprises the ring portion which is axially spaced apart from the piston crown and extends, preferentially closed, axially and in the circumferential direction. Here, the ring portion comprises a ring carrier with the ring groove for receiving a piston ring. In the ring portion, the piston outer surface merges into an outer surface of the ring portion, which in the following is also referred to as ring portion outer surface. Thus, the ring portion comprises the radially outer ring portion outer surface running in the circumferential direction. Here, the ring portion outer surface is moved radially to the inside relative to the piston outer surface. According to the invention, the piston outer surface is formed elliptically in the circumferential direction, thus runs elliptically, whereas the ring portion outer surface is formed rotation-symmetrically in the circumferential direction and thus runs rotation-symmetrically.

The elliptical course of the piston outer surface and the rotation-symmetrical course of the ring portion outer surface have the consequence that in the radial overall outer surface otherwise formed elliptically or oval the rotation-symmetrical and thus round ring portion outer surface is formed. In other words, through the rotation-symmetrical course the ring portion outer surface has an outer radius, in the following also referred to as ring portion radius, which is constant in the circumferential direction. Compared with this, the outer diameter of the contact outer surface varies along the circumferential direction.

Preferably, the piston outer surface follows an oval course in the circumferential direction. Thus, the contact outer surface has a small outer diameter and a large outer diameter which, in the circumferential direction, are turned, generally turned by 90°, i.e. run radially and generally transversely relative to one another.

Preferably and practically, the double ring portion radius and thus the ring portion outer diameter is always smaller than the outer diameters of the piston outer surface. In other words, the ring portion outer surface is preferably and practically moved radially to the inside relative to the piston outer surface over the entire circumference.

The directions stated here relate to the axial direction, at the front side of which the piston crown is arranged. Preferably, the axial direction corresponds to the stroke direction of the piston in an associated cylinder or to the longitudinal centre axis of the piston. Consequently, as is known, in the circumferential direction corresponds to extending in the axial direction. The radial direction or radially extend, as is known, transversely to the axial direction.

Generally, the ring portion can be arranged on the piston as desired provided the ring portion is axially spaced apart from the piston crown.

Preferably, the ring portion includes the ring groove next to the piston crown in the axial direction, i.e. the uppermost ring groove. This means that in the region of the uppermost ring groove, the piston is formed rotation-symmetrically and otherwise elliptically.

In principle, the piston can comprise two or more ring grooves which can be part of a portion of the piston known as ring belt to the person skilled in the art. In other words, the ring portion forms the ring belt provided the piston comprises a single ring groove or is part of the ring belt, provided the piston comprises two or more ring grooves.

Advantageously, the ring carrier is received in the piston body in the ring portion and is preferably axially spaced apart on both sides from the piston outer surface. Here, the ring carrier as part of the ring portion is arranged moved radially to the inside relative to the piston outer surface.

Preferably, the ring carrier serves for the mechanical stabilisation of the ring portion, in particular of the ring groove. The stabilisation results in an increased longevity in the ring portion subjected to major stress during the operation. In addition, the ring carrier otherwise allows forming the piston, in particular the piston body, more cost-effectively and/or in a weight-reduced manner.

Accordingly it is preferred when the piston body is produced from a light metal whereas the ring carrier is produced from a material that has a greater hardness and/or a greater resistance than the piston body. In particular, the ring carrier is made of an iron material.

In advantageous embodiments, the ring carrier partially forms the ring portion outer surface. This means that a radial outer surface of the ring carrier, in the following also called ring carrier outer surface, is part of the ring portion outer surface. Here, the ring carrier outer surface is axially spaced apart on both sides relative to the piston outer surface. This means in particular that axially on both sides of the ring carrier outer surface an outer surface of the piston body as part of the ring portion outer surface is arranged between the rotation-symmetrical ring carrier outer surface and the elliptical piston outer surface. Thus, the ring portion is partially formed by the ring carrier and partially by the piston body. Here it is preferred when the ring carrier is arranged axially centrally in the ring portion.

Embodiments, in which a radial depth of the ring groove, i.e. the radial extension from a radially inner base of the ring groove as far as to the ring portion outer surface in the circumferential direction is constant are considered preferable. This means in particular that the extension, in the following also referred to as receiving depth of the ring groove, and the ring portion outer surface are each formed rotation-symmetrically and consequently round in the circumferential direction. Thus, the production of the piston is further simplified.

Embodiments, in which a radial distance between the radially inner base of the ring groove and the piston outer surface, in the following also referred to as ring groove depth, varies in the circumferential direction are considered preferable. Here, the ring groove is preferably rotation-symmetrical, i.e. round or non-elliptical in the circumferential direction. This leads to a further simplified production of the piston.

The variation of the ring groove depth in the circumferential direction runs analogously to the local difference of the ring groove depth to the piston outer surface. Here, the ring groove depth runs in particular periodically in the circumferential direction.

Basically, the arrangement of the ring portion outer surface moved radially to the inside is adequate in order to avoid a contact of burrs possibly present on the ring groove with an associated cylinder.

It is also conceivable to deburr the ring groove and thus the ring carrier in the region of the ring groove in order to avoid or at least further reduce the risk of contact with the associated cylinder and consequently corresponding damage and/or wear.

Here, the deburring is advantageously performed by provided chamfers. Thus, the ring groove is delimited axially on the outside by two edges located axially opposite one another. At least one of the edges, advantageously the respective edge, comprises a chamfer.

Here, an axial height of the respective chamfer is preferentially constant in the circumferential direction. This is in particular the consequence of a rotation-symmetrical machining of the piston for introducing the chamfers. Consequently, producing the piston is further simplified in this manner.

Because of the elliptical course of the piston outer surface and the rotation-symmetrical course of the ring portion outer surface in the circumferential direction, the radial distance between the ring portion outer surface and the piston outer surface varies in the circumferential direction. This radial distance is also referred to as offset in the following.

Preferably, the offset relative to the small outer diameter is at least 0.01 mm, particularly preferably between 0.01 mm and 0.1 mm, in particular between 0.02 mm and 0.1 mm. This means in particular that the offset over the entire circumference amounts to at least between 0.01 mm and 0.1 mm, in particular between 0.02 mm and 0.1 mm. Accordingly, the contact of the ring carrier with the associated piston is effectively avoided or at least reduced with simple production. At the same time, this results in that a piston ring received in the ring groove has adequate contact with the associated cylinder during the operation and/or a possible reception of the piston ring in the ring groove varying in the circumferential direction is adequately compensated for. Consequently, in contrast with the piston outer surface, these conditions each result in an adequately high and reliable functionality of the piston with simplified production and reduced production costs despite forming the ring portion outer surface, preferentially the entire ring portion, rotation-symmetrical.

It is to be understood that beside the piston the method for producing the piston is also part of the scope of this invention.

For producing the piston, a blank is initially provided. Advantageously, the blank has a substantially cylindrical shape and is advantageously cast. It is also conceivable to forge the blank.

Machining the ring portion outer surface and the piston outer surface is preferably performed by way of turning in each case. The blank is rotation-symmetrically machined in order to introduce into the blank in the ring portion having the ring carrier a radial recess that follows a rotation-symmetrical course in the circumferential direction. The recess moved to the inside preferably includes the ring portion outer surface of the future piston. Thus, a preform of the piston is produced. An outer surface of the preform is machined for producing the piston so that the outer surface outside the ring portion follows an elliptical course in the circumferential direction and thus has an elliptical shape. Advantageously, the elliptical outer surface corresponds to the future elliptical shape of the piston outer surface of the piston.

Preferentially, the ring groove is introduced into the preform. By way of the ring groove, the ring portion outer surface is defined in the preform at the same time.

Introducing the ring groove is preferentially performed by grooving the ring groove into the recess, in particular into the ring carrier. For this purpose, a grooving tool is practically employed which in the following is also referred to as grooving knife. As mentioned above, introducing the ring groove is performed by feeding the grooving knife into the ring carrier and rotation-symmetrical turning between the grooving knife and the preform.

Optionally, the edges of the ring groove can be chamfered in order to form a chamfer on the respective edge. Advantageously, the chamfering is performed by a rotation-symmetrical turning of the preform relative to a tool, wherein this tool also referred to as chamfering knife in the following.

Advantageously, chamfers are introduced on the ring groove radially outside and axially on both sides. For this purpose, the same chamfering knife is employed at the same time. This means that with the same chamfering knife a chamfer each is introduced on both edges at the same time.

Through the production of the piston according to the invention, the forming of burrs and/or raised portions on the edges of the ring groove are prevented or at least reduced. Consequently, corresponding machining steps for eliminating such burrs and/or raised portions are not necessary. This results in a further simplification and cost reduction during the production of the piston. In addition, damage and wear caused by such burrs and/or raised portions are prevented or at least reduced.

Particularly preferably, the grooving knife and the chamfering knife are combined in a combination tool which is advantageously designed as a shaping tool. For introducing the ring groove and the chamfers, a combination tool, in particular as shaping tool, is thus provided. The combination tool includes the grooving knife and the chamfering knife, wherein the chamfering knife is arranged following the grooving knife. Chamfering knife and grooving knife are connected to one another so that for producing the ring groove and the at least one chamfer they can be jointly moved. Here, the grooving knife projects further towards the ring carrier than the chamfering knife. This means that the grooving knife has a radial grooving knife front side which protrudes over a radial chamfer front side of the chamfering knife. For producing the ring groove and the at least one chamfer, the combination tool is arranged radially outside of the preform, so that both front sides face the outer surface. In addition, a rotation-symmetrical relative turning movement is performed between the preform and the combination tool. In particular, the preform is rotation-symmetrically turned. During the turning movement, the combination tool is moved relative to the preform radially towards the preform so that during the turning movement initially the grooving knife and subsequently the chamfering knife enter the preform. As a consequence, the grooving knife introduces the ring groove and the chamfering knife the at least one chamfer.

As described above, the blank is preferably produced by a cast moulding method. Here it is preferred when the ring carrier is placed into the associated casting mould so that the ring carrier in the future piston is arranged in the ring portion.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
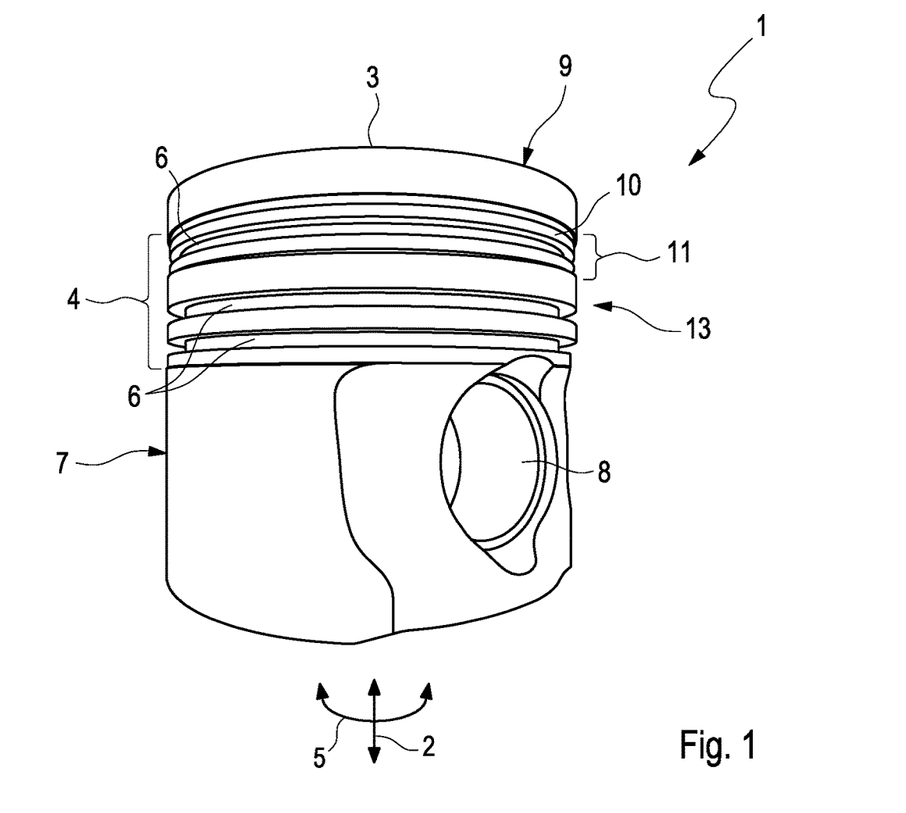
FIG. 1 shows an isometric view of a piston.

A piston 1 according to the invention for an internal combustion engine which is not otherwise shown, such as is shown for example in the FIGS. 1 to 4, comprises in an axial direction 2 a piston crown 3 at the front side. Axially adjacent to the piston crown 3, the piston 1 comprises a ring belt 4, which extends, closed in the shown exemplary embodiments, in the axial direction 2 and in a circumferential direction 5. The ring belt 4 comprises at least one ring groove 6, wherein the ring belt 4 in the shown exemplary embodiments purely exemplarily comprises three ring grooves 6. The respective ring groove 6 serves for receiving a piston ring that is not shown. On the side axially facing away from the ring belt 4 a piston skirt 7 follows which, as is evident merely from FIG. 1, is interrupted radially by at least one pin bore 8. In the shown exemplary embodiments, two pin bores 8 located radially opposite one another are provided, of which in FIG. 1 merely one is visible. Here, the piston 1 comprises a main body 9, which in the following is also referred to as piston body 9. The piston body 9 includes in the shown exemplary embodiments the piston crown 3, the ring belt 4 and the piston skirt 7. Further, the ring groove 6 axially adjacent to the piston crown 3 is formed in a ring carrier 10. The piston body 9 is made of a light metal. The ring carrier 10 is made of a material having a greater hardness and/or resistance compared with the light metal. In the shown exemplary embodiments, the ring carrier 10 is made of an iron material.

In the ring belt 4, in the region of the ring groove 6 adjacent to the piston crown 3, i.e. the axially uppermost ring groove 6, the piston 1 comprises a ring portion 11 which includes the ring groove 6 and the ring carrier 10. Further, the ring portion 11 axially on both sides of the ring carrier 10 includes a portion 12 of the piston body 9 each, so that the ring carrier 10 is arranged axially centrally in the ring portion 11. In the following, these portions 12 are each also referred to as piston body portion 12.

Figure 2:
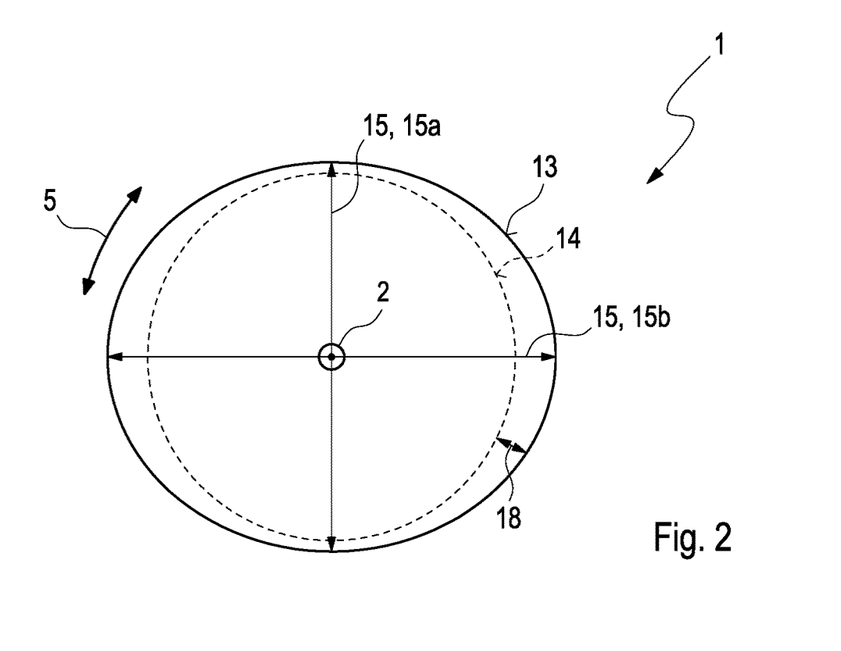
FIG. 2 shows a plan view of the piston.

As is evident from the FIGS. 1 to 4, the piston 1 comprises a radially outermost outer surface 13, which in the following is also referred to as piston outer surface 13. Here, the piston outer surface 13 extends axially and in the circumferential direction 5. Here, the piston outer surface 13 is interrupted on the piston skirt 7 in the region of the pin bores 8 in the circumferential direction and otherwise closed in the circumferential direction 5. The piston outer surface 13 is further interrupted in the axial direction 2 by the ring grooves 6 and the ring portion 11. The ring portion 11 comprises an outer surface 14 which in the following is also referred to as ring portion outer surface 14. Here, the ring portion outer surface 14 is moved relative to the piston outer surface 13 radially to the inside. FIG. 2 shows a plan view of the piston 1, wherein with the continuous line the piston outer surface 13 and with the dashed line the ring portion outer surface 14 are shown. The ring portion outer surface 14 is not visible in the plan view and for this reason also indicated dashed.

As is evident in particular from FIG. 2, the piston outer surface 13 follows an elliptical course in the circumferential direction 5. In the shown exemplary embodiments, the piston outer surface 13 follows an oval course in the circumferential direction 5 and thus has an outer diameter 15 with two extremes, which are turned relative to one another in the circumferential direction 5, in the shown exemplary embodiments by 90° (see FIG. 2). The piston outer surface 13 thus has a small outer diameter 15a and a large outer diameter 15b which in the circumferential direction 5 are turned by 90° relative to one another. In the shown exemplary embodiments, the small outer diameter 15a extends along the pin bores 8 and accordingly the large outer diameter 15b radially transversely relative to the pin bores 8. As is evident, furthermore, in particular from FIG. 2, the ring portion outer surface 14 by contrast follows a rotation-symmetrical course in the circumferential direction 5, i.e. is round. In the shown exemplary embodiments and preferably, the entire ring portion 11 is rotation-symmetrical in the circumferential direction 5. Here, FIG. 2 is shown extremely in order to render the relevant courses of the outer surfaces 13, 14 more visible. The FIGS. 3 and 4 each show a section through the piston 1 in the region of the ring portion 11.

Figure 3:
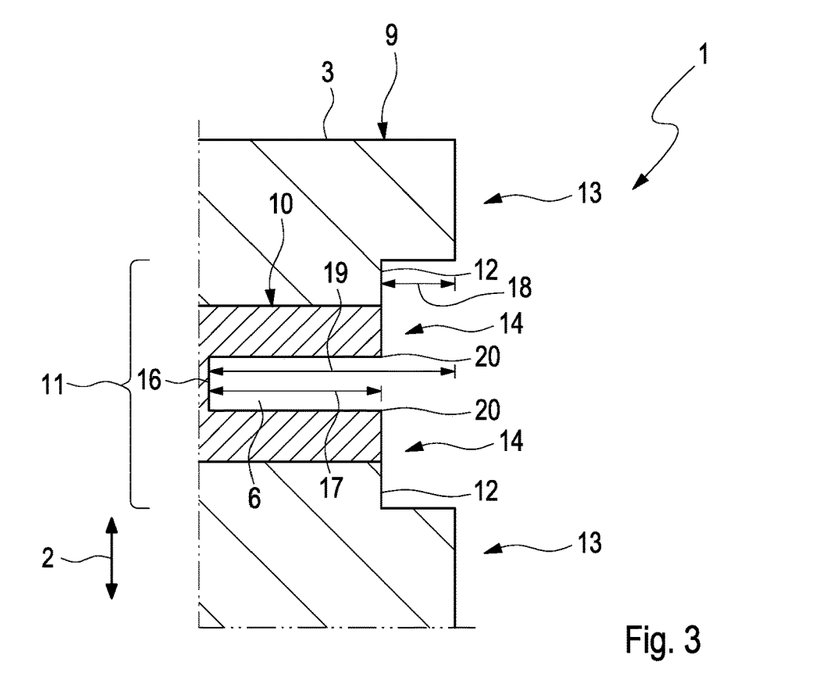
FIG. 3 shows a section through the piston in the region of a ring groove.
Figure 4:
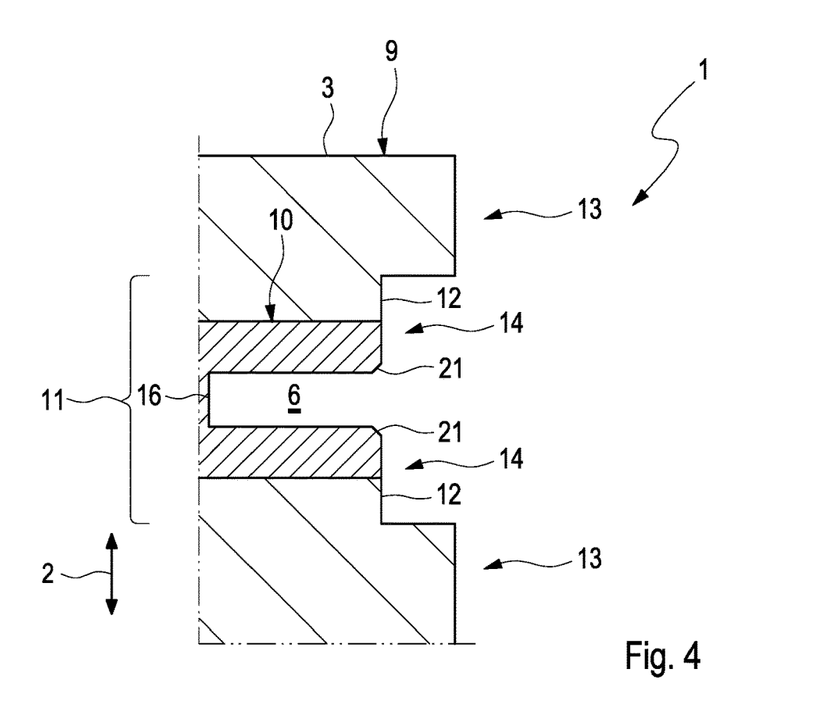
FIG. 4 shows a section through the piston in the region of the ring groove with another exemplary embodiment.

As is evident in particular from the FIGS. 3 and 4, the ring portion outer surface 14 is formed by the ring carrier 10 axially centrally. As is further evident from the FIGS. 3 and 4, the ring groove 6 comprises radially inside a base 16 following an axial course. A radial extension 17 of the ring groove 6 from the base 16 as far as to the ring portion outer surface 14 (see FIG. 3), in the following also referred to as receiving depth 17, is constant in the circumferential direction 5 in the shown exemplary embodiments. By contrast, a radial distance 18 of the ring portion outer surface 14 to the piston outer surface 13 (see FIGS. 2 and 3), in the following also referred to as offset 18, varies in the circumferential direction 5. Here, the offset 18 with the large outer diameter 15b reaches a maximum and with the small outer diameter 15a minimum value, wherein the value is always greater than zero. Accordingly, a radial extension 19 from the base 16 of the ring groove 6 as far as to the piston outer surface 13 (see FIG. 3), which in the following is also referred to as ring groove depth 19, also varies in the circumferential direction 5.

The exemplary embodiment shown in FIG. 4 differs from the exemplary embodiment shown in the FIGS. 1 to 3 in that on the radially outer and axially opposite edges 20 of the ring groove 6 a chamfer 21 each is introduced.

Figure 5:
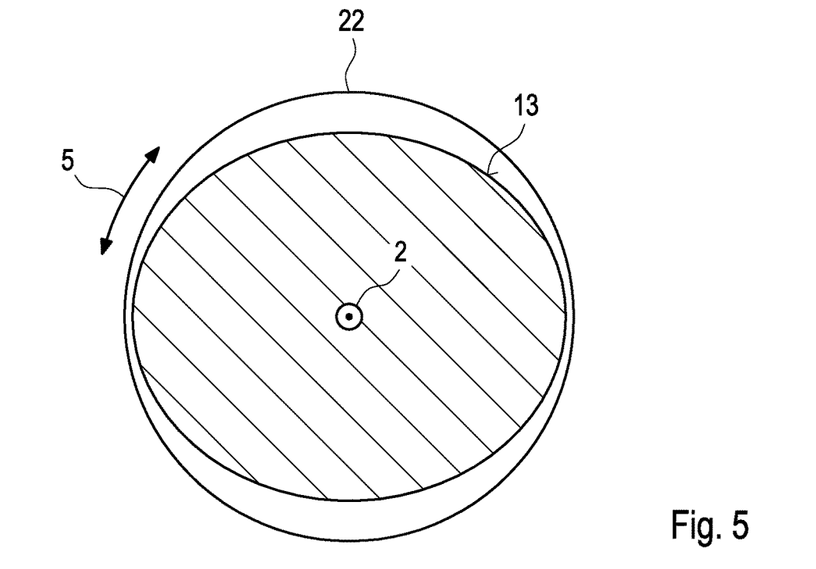
FIG. 5 shows a plan view of a blank and of a preform during the production of the piston.
Figure 6:
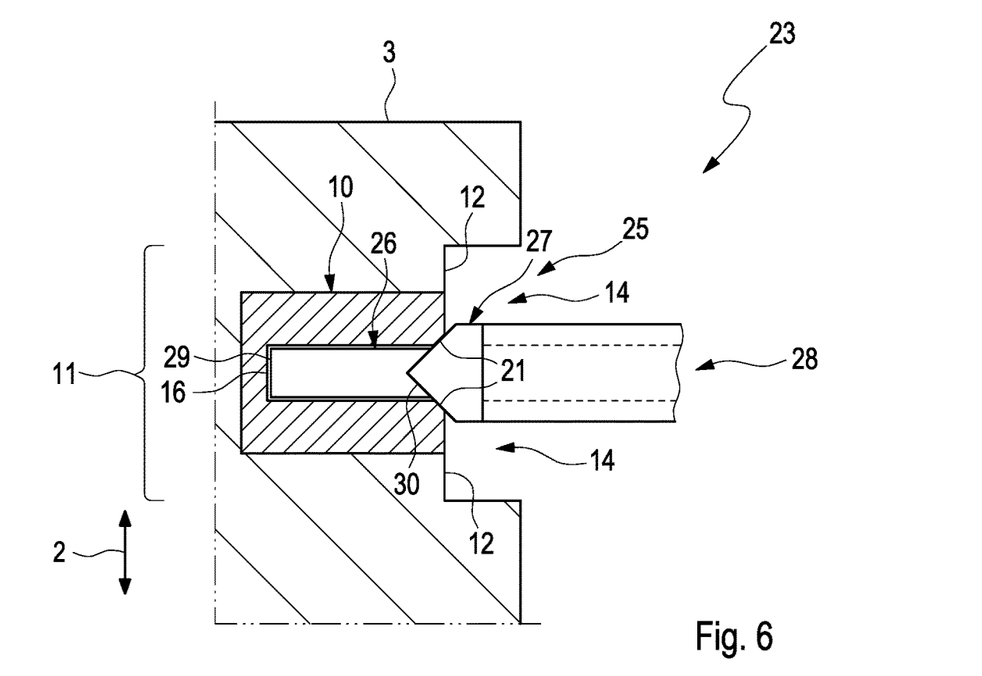
FIG. 6 shows a section through the preform with a combination tool for producing the piston.

According to the FIGS. 5 and 6, the production of the piston 1 takes place by providing a blank 22, which in FIG. 5 is visible in a plan view. In the shown example, the blank 22 is produced by casting the light metal in a casting mould which is not shown. During the casting operation, the ring carrier 10 is arranged in the casting mould in such a manner that the ring carrier 10 in the future piston 1 is arranged in the ring portion 11.

In the cast mould, the ring carrier 10 is over-moulded with the light metal in order to produce the blank 22. As is evident from FIG. 5, the blank 22 has a substantially cylindrical shape in the shown example.

The blank 22 is initially machined into a preform 23 shown in FIG. 6. Here, the machining is performed by turning. In the process, a recess 25 is introduced by a rotation-symmetrical turning radially into the blank 22 in the region of the ring portion 11 comprising the ring carrier 10 using a tool which is not shown. Accordingly, the recess 25 is rotation-symmetrical in the circumferential direction 5. Here, the ring carrier 10 is arranged axially centrally in the recess 25. Here, FIG. 6 shows the preform 23 and thus the already introduced recess 25.

As is exemplarily shown in FIG. 6, the ring groove 6 is subsequently introduced into the recess 25. In the shown example, this is performed by feeding the ring groove 6 into the ring carrier 10 centrally arranged in the recess 25, so that the ring groove 6 is formed axially centrally in the ring carrier 10. Introducing the ring groove 6 in turn is performed by a rotation-symmetrical turning of the preform 23 relative to a tool 26 for introducing the ring groove 6, which in the following is also referred to as grooving knife 26. Here, FIG. 6 shows a state in which the grooving knife 26 is radially fed into the ring carrier 10 so far that the ring groove 6 in the shown section already has the receiving depth 17.

Further in the exemplary embodiment shown in FIG. 6, the edges 20 of the ring groove 6 are each provided with a chamfer 21. This is again performed through a rotation-symmetrical turning of the preform 23 relative to a tool 27 for introducing the chamfers 21, wherein the tool 27 in the following is also referred to as chamfering knife 27. As is evident from FIG. 6, the chamfering knife 27 is provided with a, in the shown section, substantially triangular tip, so that both edges 20 are simultaneously provided with a chamfer 27 each.

In the exemplary embodiment shown in FIG. 6, the grooving of the ring groove 6 and the introducing of the chamfers 21 is performed with a combination tool 28 in the manner of a shaping tool, which includes the grooving knife 26 and the chamfering knife 27. Alternatively, this process can also be realised with a shaping knife (not shown), which already includes the chamfer. The grooving knife 26 and the chamfering knife 27 are connected to one another in the combination tool 28 in such a manner that they are jointly moveable. For grooving the ring groove 6 and for introducing the chamfers 21, the combination tool 28 is arranged radially outside of the preform 23. Here, a front side 29 of the grooving knife 26 and a front side 30 of the chamfering knife 27 including the tip of the chamfering knife 27 face the recess 25. In addition, the grooving knife 26 and the chamfering knife 27 are arranged next to one another in such a manner that the chamfering knife 27 follows the grooving knife 26 in the circumferential direction 5 and/or tangentially to the ring portion 11. Then, a rotation-symmetrical relative turning movement between the combination tool 28 and the preform 23 takes place. In particular, the preform 23 is rotation-symmetrically turned. In the process, a radial movement of the combination tool 28 in the direction of the recess 25 takes place in such a manner that initially the grooving knife 26 grooves the ring groove 6 into the ring carrier 10 and in such a manner that during the grooving or following the same the chamfering knife 27 introduces the chamfers 21.

According to FIG. 6, a machining of the blank 22 can take place in such a manner that the preform 23 already comprises the piston crown 3.

Following this, the preform 23 is machined to form the piston 1. Here, the machining takes place by turning and in such a manner that the piston outer surface 13 is introduced into the preform 23 outside the ring portion 11 (see FIGS. 5 and 6), which runs elliptically in the circumferential direction 5. For the turning of the preform 23 to form the piston 1, a correspondingly elliptical turning movement of the preform 23 relative to a tool that is not shown takes place in the process.

In contrast with producing the piston outer surface 13, the introducing of the recess 25 and of the ring groove 6 including chamfers 21 thus takes place by a rotation-symmetrical machining by turning. Thus, producing the ring portion 11, in contrast with producing the piston outer surface 13 that is elliptical in the circumferential direction 5, takes place with a rotation-symmetrically turning movement relative to corresponding tools, in particular the combination tool 28. Thus, producing the piston 1 is substantially simplified.

The piston 1, in particular the method for producing the piston 1, has as a consequence in particular that during the entire production of the piston 1 no raised portions and/or burrs form on the edges 20. Thus, subsequent machining for removing such raised portions and/or burrs becomes superfluous so that producing the piston 1 is further simplified. In addition to this, wear and damage caused by such raised portions and/or burrs are prevented.

The invention claimed is:

1. A piston for an internal combustion engine, comprising:
   a piston crown disposed at a front side in an axial direction;
   a piston body having a radially outermost piston outer surface, which emanating from the piston crown extends axially and in a circumferential direction;
   a ring portion disposed axially spaced apart from the piston crown, the ring portion extending axially and in the circumferential direction, the ring portion including a ring carrier with a ring groove configured to receive a piston ring;
   the ring portion further including a radially outer ring portion outer surface that extends in the circumferential direction;
   the ring portion outer surface disposed radially to an inside relative to the piston outer surface;
   wherein the piston outer surface extends elliptically in the circumferential direction;
   wherein the ring portion outer surface extends rotation-symmetrically in the circumferential direction; and
   wherein an offset distance between the ring portion outer surface and the piston outer surface is 0.01 mm to 0.1 mm.

2. The piston according to claim 1, wherein:
   the piston body is composed of a light metal;
   the ring carrier is received in the ring portion in the piston body and is composed of a material having a greater hardness than the piston body;
   the ring carrier is disposed axially spaced apart from the piston outer surface on both sides; and
   the ring carrier is arranged radially to the inside relative to the piston outer surface.

3. The piston according to claim 1, wherein:
   the ring groove has a radially inner base; and
   a receiving depth of the ring groove extending radially from the inner base to the ring portion outer surface is constant in the circumferential direction.

4. The piston according to claim 1, wherein:
   the ring groove has a radially inner base; and
   a ring groove depth of the ring groove extending radially from the inner base to the piston outer surface varies in the circumferential direction.

5. The piston according to claim 1, wherein:
   the ring groove is delimited radially outside by two edges disposed axially opposite one another; and
   at least one of the two edges includes a chamfer.

6. The piston according to claim 1, wherein a radially outward facing offset surface of the piston body and a radially outward facing surface of the ring carrier are arranged flush with one another and collectively define the ring portion outer surface.

7. The piston according to claim 6, wherein an end of the offset surface of the piston body is axially aligned with and contacts an end of the radially outward facing surface of the ring carrier.

8. The piston according to claim 7, wherein the radially outward facing surface of the ring carrier and the offset surface of the piston body extend parallel to the axial direction.

9. The piston according to claim 6, wherein:
the ring carrier is structured independently and separately from the piston body; and
the ring carrier is at least partially embedded in the ring portion of the piston body.

10. The piston according to claim 6, wherein:
the piston body is composed of a light metal; and
the ring carrier is received in the ring portion in the piston body and is composed of a material having a greater hardness than the piston body.

11. A method for producing a piston including a piston crown disposed at a front side in an axial direction, a piston body having a radially outermost piston outer surface, which emanating from the piston crown extends axially and in a circumferential direction, and a ring portion disposed axially spaced apart from the piston crown, the ring portion extending axially and in the circumferential direction, the ring portion including a ring carrier with a ring groove configured to receive a piston ring, the method comprising:
providing a blank;
producing a preform via rotation-symmetrically introducing a radial recess into the blank;
forming a radially outer ring portion outer surface in the ring portion via rotation-symmetrically introducing the ring groove into the recess, the ring portion outer surface extending rotation-symmetrically in the circumferential direction and disposed radially to an inside relative to the piston outer surface;
elliptically machining the preform such that the piston outer surface extends elliptically in the circumferential direction; and
wherein an offset distance between the ring portion outer surface and the piston outer surface is 0.01 mm to 0.1 mm.

12. The method according to claim 11, further comprising introducing a chamfer on at least one radially outer edge of the ring groove.

13. The method according to claim 12, further comprising:
providing a combination tool including a grooving knife and a chamfering knife, the chamfering knife arranged following the grooving knife and connected to the grooving knife, the grooving knife including a radial grooving knife front side protruding over a radial chamfering front side of the chamfering knife;
arranging the combination tool radially outside of the preform such that the grooving knife front side and the chamfering front side face the recess;
performing a rotation-symmetrical relative turning movement between the preform and the combination tool; and
wherein introducing the ring groove and introducing the chamfer includes moving the combination tool radially towards the preform while performing the turning movement such that, during the turning movement, initially the grooving knife and subsequently the chamfering knife enter the recess, the grooving knife introduces the ring groove into the recess, and the chamfering knife introduces the chamfer on the at least one radially outer edge of the ring groove.

14. The method according to claim 11, wherein:
providing the blank includes producing the blank via a casting method; and
producing the blank includes placing the ring carrier in a casting mould such that the ring carrier will be arranged in the ring portion of the piston.

15. A piston for an internal combustion engine, comprising:
a piston crown;
a piston body having a piston outer surface facing radially outward and extending from the piston crown in an axial direction, the piston outer surface having an elliptical-shaped cross-sectional profile perpendicular to the axial direction;
a ring carrier disposed in the piston body, the ring carrier including a ring groove configured to receive a piston ring;
a ring portion defined at least partially by the piston body and the ring carrier, the ring portion disposed axially spaced apart from the piston crown, the ring portion extending in the axial direction and in a circumferential direction;
the ring portion having a ring portion outer surface facing radially outward and extending rotation-symmetrically in the circumferential direction;
wherein the ring portion outer surface is disposed offset from the piston outer surface in a radially inward direction;
wherein a radially outward facing offset surface of the piston body and a radially outward facing surface of the ring carrier are arranged flush with one another and collectively define the ring portion outer surface; and
wherein an offset distance between the ring portion outer surface and the piston outer surface is 0.01 mm to 0.1 mm.

16. The piston according to claim 15, wherein an end of the offset surface of the piston body is axially aligned with and contacts an end of the radially outward facing surface of the ring carrier.

17. The piston according to claim 15, wherein the radially outward facing surface of the ring carrier and the offset surface of the piston body extend parallel to the axial direction.

18. The piston according to claim 15, wherein both axial ends of the ring carrier are disposed axially spaced apart from the piston outer surface.

19. The piston according to claim 15, wherein two edges of the ring carrier that at least partially delimit the ring groove each include a chamfer.

* * * * *